Moore & Kelly,
Making Fence Pickets,
No 27,923.    Patented Apr. 17, 1860.
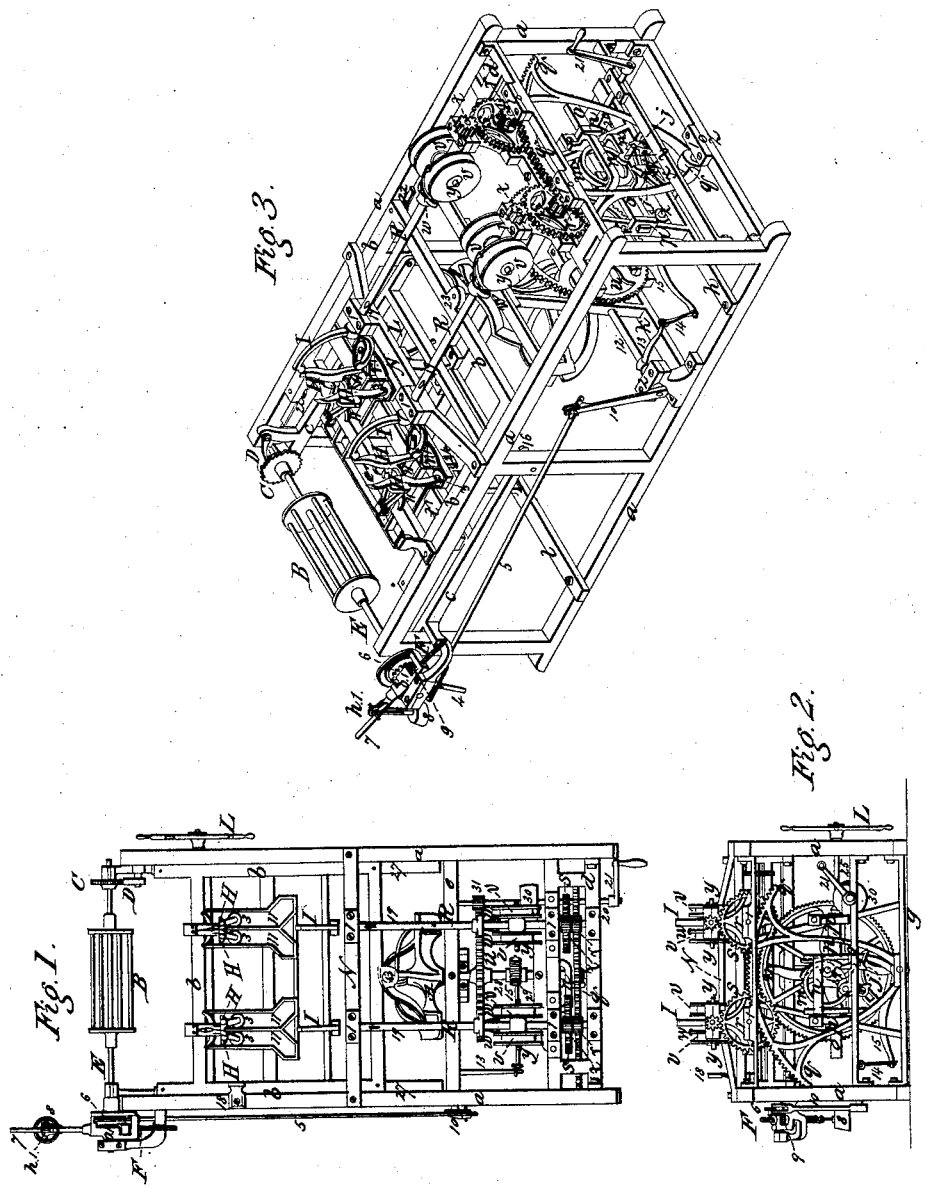

UNITED STATES PATENT OFFICE.

JAMES MOORE AND ARCHIBALD KELLY, OF PITTSBURG, PENNSYLVANIA.

IMPROVED MACHINE FOR MAKING PICKET-FENCE.

Specification forming part of Letters Patent No. 27,923, dated April 17, 1860.

*To all whom it may concern:*

Be it known that we, JAMES MOORE and ARCHIBALD KELLY, of the city of Pittsburg, in the county of Allegheny and State of Pennsylvania, have invented a new and useful Improvement in Machines for Making Picket-Fence; and we do hereby declare that the following is a full and exact description thereof, reference being had to the accompanying drawings, and to the letters of reference marked thereon.

Similar letters refer to similar parts in the several figures.

The nature of our invention consists in a mechanical arrangement of twisters, guides, carriage, reels, and take-up, the whole being arranged, constructed, and operated in the manner hereinafter described, for the purpose of forming a machine for making picket-fences.

In the accompanying drawings, Figure 1 is a top view of the machine. Fig. 2 is an end view. Fig. 3 is a perspective view.

$a$ is the frame of the machine. $b$ is a carriage, which is furnished with guides H, which have guide-wheels 3, which work in the ways 11, which are secured to the cross-piece $r'$ of frame $a$. The guides H are used for the purpose of keeping the wire used in making picket-fences on a straight and parallel line with the shafts R, and are furnished with notches $e'$, which are used for the purpose of bringing the edge of the pickets on a line with the center of the shafts R and parallel with each other. The notches $e'$ are also used, in connection with the guides H and the carriage $b$, for forcing the pickets into their proper position between the wires. The desired movements are imparted to the carriage and guides by the cam-wheel A, which is secured to the shaft 28.

The frame C, which supports the reel B on shaft E, is attached to frame $a$ by means of two bolts, 16, and can be raised or lowered by means of rack 24 and a pinion on shaft 25, which is operated by the levers L.

The take-up, which consists of the piece $o'$, screw F, nut 9, ratchet-wheel 6, support 7 for the weight 8, lever 4, and pulley $h'$, is operated by the upward movement of the weight, which is raised up by means of levers 5, 10, 13, 14, and 15, and cam 29. At each upward movement of the weight the nut 9 of the screw F is revolved, which moves the screw out, thereby moving the weight out on the support 7. The pulley $h'$, to which the weight is secured, is used for the purpose of avoiding friction. The nut 9 is furnished with teeth, which gear into teeth on the side of the ratchet-wheel 6, which remains stationary during the upward movement of the weight, thereby revolving the nut which operates the screw F. The take-up is used for the purpose of preventing sagging in the web as it leaves the guides H. The reel B on shaft E is used for the purpose of winding up the fence as it is made. The ratchet-wheel C and pawl D are used for the purpose of holding the reel B in its proper position. The pinion 31 gears into the wheel $u$, and is placed on shaft 20, with the driving-pulley 30. 21 is a crank used for operating the machine by hand. The section of a wheel, $q$, and lever 15 is placed on shaft Z, and levers 10 and 13 are secured to shaft 12. The twisters I, springs $w$, and reels $v$ are secured to shafts R.

$y$ are the axles of the reels $v$. The springs $w$ are used for the purpose of preventing the reels $v$ from overrunning or paying out the wire too fast. The reels $v$ are used for supplying the twisters I with wire, which passes from reels $v$ through the opening 19 in shaft R, and through the hub and openings $r'$ of the twisters I.

22 are friction-rollers used for the purpose of preventing side friction of the carriage $b$. N, $g$, $d$, $k$, $l$, and $h$ are cross-pieces of the frame $a$, and are used for supports. 27 are slides on which the carriage $b$ moves. $m$ is a cam which operates the cam-yoke $n$, which is furnished with a projection, $i$, and slides $o$, which move in guides $p$. The projection $i$ is used in connection with the operating-stops $j$, for the purpose of operating the section of a wheel, $q$, and giving to it an oscillating motion, which gives to the wheels $r$, $s$, and $t$, reels $v$, and twisters I an alternate motion, and thereby giving a right-and-left-hand twist to the wires between the pickets. The length of the twist between the pickets is regulated by placing the stops $j$ closer together or farther apart on the arch $x$ of wheel $q$. The sweep of the wheel $q$ will be in accordance with the position of the stops $j$. 1 and 2 are journal-bearings. 18 is a stop used for the purpose of bringing the points of the pickets on a straight line with each other.

The operation of our improvement is as follows: When the machine is worked by steampower, a belt is placed on pulley 30; but when worked by hand, the power is applied to the crank 21. The wheel $u$, cam-wheel A, and cams $m$ and 29 are placed on the shaft 28, and the revolving of the pinion 31, which gears into the wheel $u$, imparts motion to it and also to the cam-wheel A and cams $m$ and 29. The cam $m$ operates the cam-yoke $n$, which operates the section of a wheel, $q$, which operates the pinions $r$ and wheels $s$. (The pinions $r$ and wheels $s$ are secured on the same shaft.) The wheels $s$ operate the pinions $t$, reels $v$, and twisters I. The cam-wheel A operates the carriage $b$ by means of the flanges of the wheel operating against the pulley 23. The wire is placed on reels $v$, and passes from them through openings 19 in shafts R and through openings $r'$ in the points of the twisters I, and passes between the guides H to the reel B, and are secured to it. A picket is then placed between the wires, with one edge placed in the notches $e'$ of the guides H. The carriage $b$ then moves toward the reel B, closing the guides H upon the wires, and draws the wire off the reels $v$ for the next picket. The twisters I then stop operating, and the carriage returns for another picket. The guides H and twisters I, when ready for receiving the picket, will be in the position represented in Fig. 3.

Having thus described the nature, construction, and operation of our improvement, what we claim as of our invention, and desire to secure by Letters Patent of the United States, is—

1. The arrangement of the wheels 31 and $u$, cam $m$, cam-yoke $n$, operating and regulating stops $j$, section of a wheel, $q$, and wheels $r$, $s$, and $t$, in combination with the reels $v$, springs $w$, and twisters I, as herein described, and for the purpose set forth.

2. The use of the carriage $b$, when used in combination with the twisters I, reels $v$, and cam-wheel A, as herein described and set forth.

3. The use of guides H, when used in connection with the carriage $b$ and ways 11, as herein described, and for the purpose set forth.

4. The combination of the take-up, reel B, ratchet-wheel C, ratchet-pawl D, and frame $c$, when arranged, constructed, and operated in the manner specified, for the purpose set forth.

JAMES MOORE.
ARCHD. KELLY.

Witnesses:
GEORGE P. STECK,
JAMES J. JOHNSTON.